(12) United States Patent
Morishima et al.

(10) Patent No.: US 6,604,573 B2
(45) Date of Patent: Aug. 12, 2003

(54) HYDROGEN OCCLUDING CORE

(75) Inventors: Shingo Morishima, Okazaki (JP); Tadayoshi Terao, Toyoake (JP); Toshihiro Mafune, Kariya (JP)

(73) Assignee: Denso Corporation, Kariya (JP)

( * ) Notice: Subject to any disclaimer, the term of this patent is extended or adjusted under 35 U.S.C. 154(b) by 262 days.

(21) Appl. No.: 09/737,030

(22) Filed: Dec. 14, 2000

(65) Prior Publication Data

US 2001/0004013 A1 Jun. 21, 2001

(30) Foreign Application Priority Data

Dec. 17, 1999 (JP) .......................................... 11-359765
Dec. 17, 1999 (JP) .......................................... 11-359766
Dec. 22, 1999 (JP) .......................................... 11-365039

(51) Int. Cl.$^7$ ................................................ F28D 1/02
(52) U.S. Cl. ........................ 165/153; 165/907; 165/84; 165/176
(58) Field of Search ............................ 165/907, 83, 84, 165/178, 82, 176, 153; 29/890.044

(56) References Cited

U.S. PATENT DOCUMENTS

| 2,401,797 A | * | 6/1946 | Rasmussen ................. 165/164 |
| 5,141,720 A | * | 8/1992 | Malmstrom et al. ......... 165/907 |
| 6,284,206 B1 | * | 9/2001 | Lesieur et al. ................ 165/58 |

FOREIGN PATENT DOCUMENTS

| JP | A-3-101062 | * | 4/1991 |
| JP | A-5-106792 | * | 4/1993 |
| JP | A-8-115732 | * | 5/1996 |

* cited by examiner

Primary Examiner—Denise L. Esquivel
Assistant Examiner—Terrell McKinnon
(74) Attorney, Agent, or Firm—Harness, Dickey & Pierce, PLC

(57) ABSTRACT

A tube is provided with elastically deformable tube deforming sections (tube curved sections), and a fin is provided with the quality of spring so that the fin deforms in accordance to changes of dimension between the tubes. Accordingly, it is possible to weaken (absorb) stress by the tube deforming sections (tube curved sections), and to prevent the fin from separating from the tube even when the tube deforming section (tube curved section) deforms.

4 Claims, 12 Drawing Sheets

FIG. I

START MODE

STATIONARY MODE

FIRST STATIONARY MODE

SECOND STATIONARY MODE

HYDROGEN OCCLUDING CORE

CROSS REFERENCE TO RELATED APPLICATION

This application is based on and incorporates herein by reference Japanese Patent Application Nos. Hei. 11-359765 filed on Dec. 17, 1999, Hei. 11-359766 filed on Dec. 17, 1999, and Hei. 11-365039 filed on Dec. 22, 1999.

BACKGROUND OF THE INVENTION

1. Field of the Invention

The present invention relates to a hydrogen occluding core (hydrogen occluding member integrated heat exchanger) for exchanging heat between a hydrogen occluding member that occludes and dissociates hydrogen and a heating medium

2. Description of Related Art

JP-A-5-106792 discloses that the heat exchanging capability of a hydrogen occluding core has been improved by filling granular hydrogen occluding member between tubes through which heating medium flows.

Since the hydrogen occluding member swallows and expands when it occludes hydrogen and contracts and granulates when it dissociates hydrogen, there has been a possibility that the tube is damaged when the hydrogen occluding member repeats the occlusion and dissociation of hydrogen because stress is generated in the tube along the expansion and contraction of the hydrogen occluding member when the hydrogen occluding member is simply filled between the tubes as described in the above-mentioned publication.

The hydrogen occluding member (hereinafter abbreviated as occluding member) is what occludes and dissociates hydrogen within the atmosphere so that the atmospheric pressure of the occluding member is equalized with the dissociation equilibrium pressure and the dissociation equilibrium pressure is uniquely determined by the temperature and type of the occluding member.

The dissociation equilibrium pressure changes almost proportionally such that the higher the temperature of the occluding member, the greater it becomes. Therefore, when the occluding member is cooled, the dissociation equilibrium pressure drops and the occluding member tries to occlude hydrogen until when the atmospheric pressure is equalized with the dropped dissociation equilibrium pressure. Meanwhile, when the occluding member is heated, the dissociation equilibrium pressure rises, so that the occluding member tries to dissociate hydrogen until when the atmospheric pressure is equalized with the raised dissociation equilibrium pressure.

Then, according to JP-A-3-101062 for example, an electrical heater has been used as heating means for heating the occluding member.

However, the invention described in JP-A-3-101062 has had a problem that it requires a power source such as a battery for the electrical heater.

It is conceivable of storing hydrogen itself in a hydrogen tank instead of occluding hydrogen to the occluding member to deal with this problem. However, the hydrogen tank cannot but be large with this means because hydrogen must be charged to the hydrogen tank by pressurizing (liquefying) hydrogen to store an enough quantity of hydrogen.

It is also conceivable of storing hot water in a heat insulating tank and of utilizing sensible heat of the hot water instead of the electrical heater as means for heating the occluding member. However, a hydrogen supplying system cannot be large and the production cost cannot but be high because it requires the heat insulating tank which excels in the heat insulating quality and which has an enough capacity.

Further, as a hydrogen supplying system, JP-A-8-115732 discloses that a heating unit for heating hydrogen occluding member is disposed within at least one occluding member tank among a plurality of occluding member tanks in which the hydrogen occluding member is stored to supply hydrogen stably even when the temperature is low.

However, the invention described in JP-A-8-115732 has had a problem that although it is possible to supply an enough quantity of hydrogen by heating the hydrogen occluding member by the heating unit when an enough quantity of hydrogen is occluded in the hydrogen occluding member within the occluding member tank in which the heating unit is disposed, it is unable to supply an enough quantity of hydrogen when an enough quantity of hydrogen is not occluded in the hydrogen occluding member within the occluding member tank in which the heating unit is disposed.

SUMMARY OF THE INVENTION

An object of the invention to weaken the stress that is generated in the tube along the occlusion and dissociation of hydrogen.

According to a first aspect of the present invention, an inventive hydrogen occluding core having tubes through which heating medium flows, hydrogen occluding member filled around the tubes to occlude and dissociate hydrogen to exchange heat between the hydrogen occluding member and the heating medium is characterized in that the tube is provided with elastically deformable tube deforming sections and that the thickness of the tube deforming section is thinner than that of the other part.

Thus, it allows the stress generated in the tube by the occlusion and dissociation of hydrogen to be weakened (absorbed), so that it is possible to prevent the tube from being damaged and to improve the reliability and durability of the hydrogen occluding core.

According to a second aspect of the present invention, hydrogen occluding member is filled in a space between each of said plurality of tubes, and the space includes a non-filling section at longitudinal end thereof, in which no hydrogen occluding member is filled.

Thus, the maximum stress acting on the tubes is reduced, thereby preventing the tubes from being broken.

According to a third aspect of the present invention, hydrogen occluding member is filled around the tube in such a manner that it is stored within a container made of a material which does not occlude nor dissociate hydrogen.

Since the volume of the container does not almost change in comparison with that of the hydrogen occluding member, stress acting on the tube due to occluding and dissociating hydrogen is reduced.

According to a fourth aspect of the present invention, hydrogen occluding member is filled around the tube together with elastically deformable elastic member.

Since the deformable elastic member absorbs the volume fluctuation of the hydrogen occluding member even when the hydrogen occluding member expands and contracts, stress acting on the tube due to occluding and dissociating hydrogen is reduced.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

First Embodiment

Figure 1:
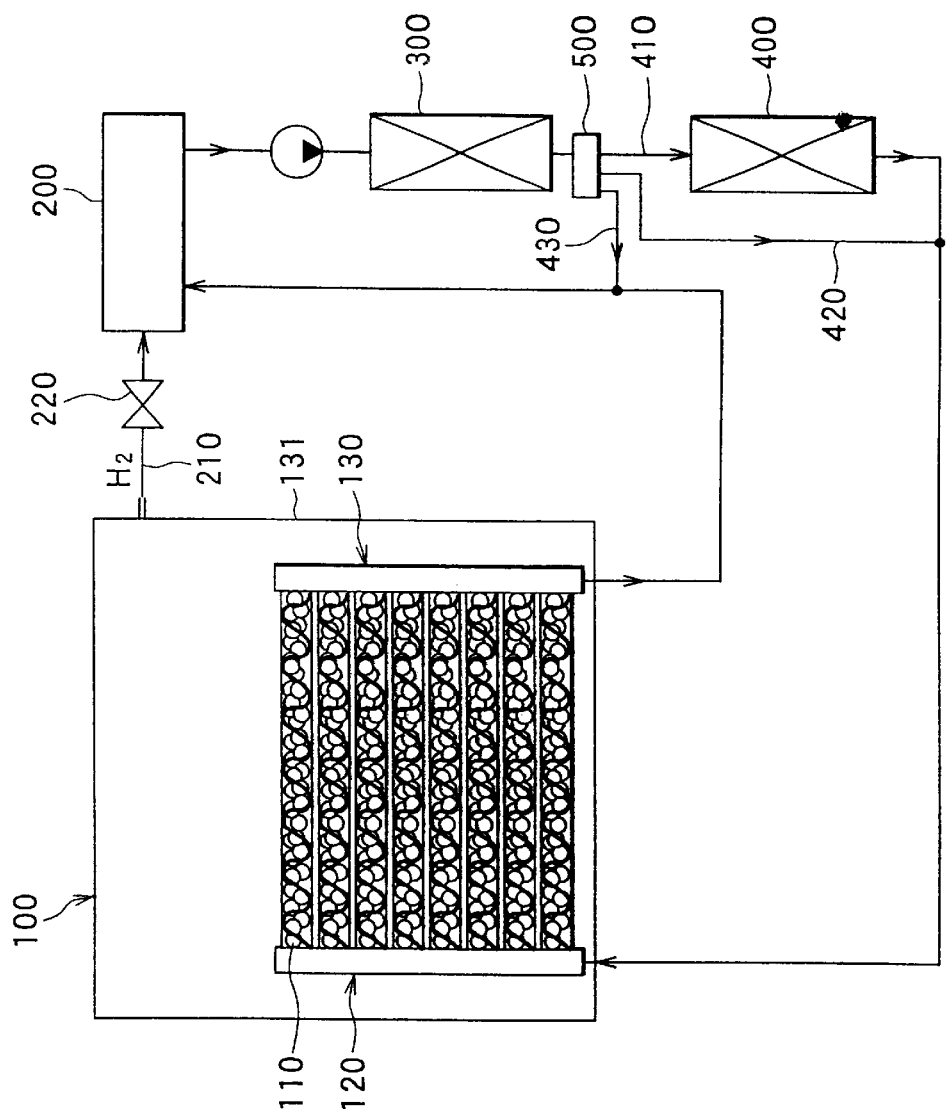
FIG. 1 is a schematic view showing a vehicle heating system using a hydrogen occluding core (first embodiment)

The present embodiment is what is applied to a vehicle heating system including a hydrogen supply system using an inventive hydrogen occluding core. FIG. 1 is a schematic view showing the vehicle heating system of the present embodiment.

In FIG. 1, reference numeral 100 denotes the hydrogen supply system storing and supplying hydrogen, and reference numeral 200 denotes a burning type heater (hereinafter referred as a heater) for generating heat by burning hydrogen supplied from the hydrogen supply system 100.

The reference numeral 300 denotes a heater core for heating air blown out to an interior of the car by using heating medium (fluid in which ethylene glycol anti-freezing fluid is mixed with water in the present embodiment) heated by the heater 200, and reference numeral 400 denotes a radiator for cooling the heating medium by heat-exchanging the heating medium with the outside air.

It is noted that the heating medium passage (heating medium pipe) at the heating medium output side of the heater core 300 is branched to three passages of a radiator passage 410 for guiding the heating medium to the radiator 400, a first bypass passage 420 for flowing the heating medium to the hydrogen supply system 100 (hydrogen occluding core) by bypassing the radiator 400 and a second bypassing passage 430 for flowing the heating medium to the heater 200 by bypassing the radiator 400 and the hydrogen supply system 100.

A flow control valve 500 for controlling a flow rate of the heating medium flowing through the respective passages 410, 420 and 430 is provided at the branching section to control temperature (dissociation equilibrium pressure of the hydrogen occluding member) of the hydrogen supply system 100 (hydrogen occluding core) by controlling the flow control valve 500.

Reference numeral 210 denotes a hydrogen supply pipe for supplying hydrogen generated by the hydrogen supply system 100 to the heater 200, and reference numeral 220 denotes a valve for controlling the state of communication of the hydrogen supply pipe 210.

Next, the hydrogen supply system will be explained.

As shown in FIG. 1, the hydrogen supply system 100 comprises granular hydrogen occluding member (LaNi5) 110 for occluding and dissociating hydrogen, a heat exchanger 120 for heat-exchanging the occluding member 110 with the heating medium and a casing 131 for storing the occluding member 110 and the heat exchanger 120.

Figure 2:
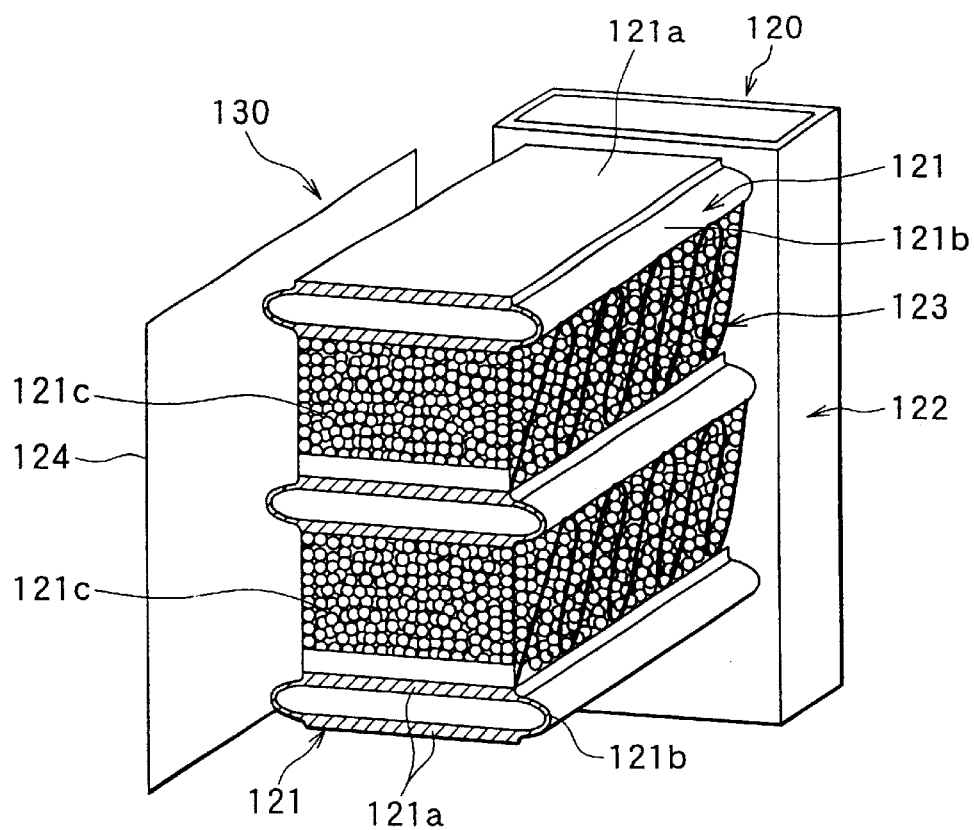
FIG. 2 is a perspective section view showing the hydrogen occluding core (first embodiment)

As shown in FIG. 2, the heat exchanger 120 is a so-called multi-flow heat exchanger including a plurality of tubes 121 through which the heating medium flows, header tanks 122 disposed at the both ends of the tubes 121 in the longitudinal direction and communicating with the plurality of tubes 121 and fins 123 disposed between the tubes 121 to promote heat-exchange of the heating medium and the occluding member 110. The tubes 121 and the fins 123 are both made of SUS 316L.

It is noted that the tube 121 and the header tank 122 are formed by extruding or drawing aluminum members and the fin 123 is formed into the shape of wave by roller molding. These parts 121 through 123 are jointed in a body by brazing.

The occluding member 110 is filled around the tube 121 (in spaces 121c between the tubes 121 where the fins 123 are disposed in the present embodiment) and two hydrogen permeable films 124 (illustrated only one sheet in FIG. 2) which is smaller than the occluding member 110 and which has holes larger than hydrogen are provided to cover the part between the tubes 121 to prevent the occluding member 110 from falling from the gap between the tubes 121. The heat exchanger 120 in which the occluding member 110 is filled will be called as a hydrogen occluding core 130 hereinafter.

Figure 3:
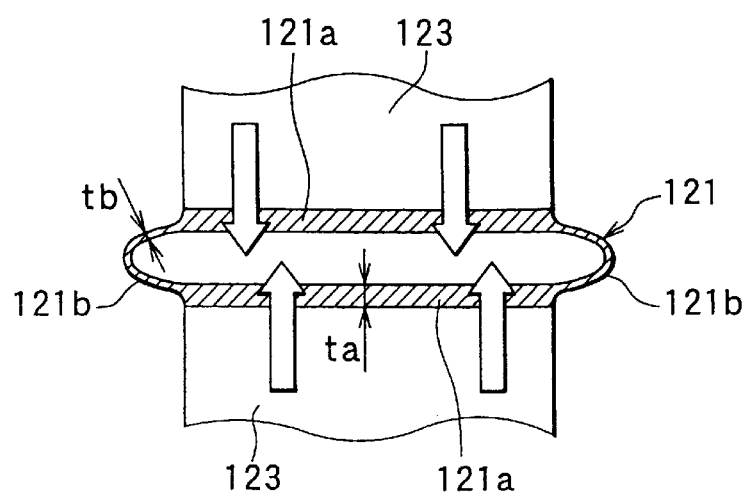
FIG. 3 is a cross sectional view showing a tube of the hydrogen occluding core (first embodiment)

As shown in FIG. 3, the tube 121 has an elliptical (flattened) sectional profile such that it has belt-like flat sections 121a which extend in the longitudinal direction of the tube 121 while facing to each other and tube curved sections 121b curved approximately in the shape of circular arc while connecting the both ends of the flat section 121a in the width direction (the direction orthogonal to the longitudinal direction) and the thickness tb of the tube curved section 121b is thinned as compared to the thickness ta of the plane section 121a to create the elastically deformable tube deform section. In concrete, tb is 0.2 mm and ta is 0.4 mm. These are effective values when the volume of the occluding member is 150 cc and when the coefficient of volume expansion of the occluding member in occluding hydrogen in maximum is 20%. Thereby, the volume change may be absorbed by the thin part of the tube.

Figure 4:
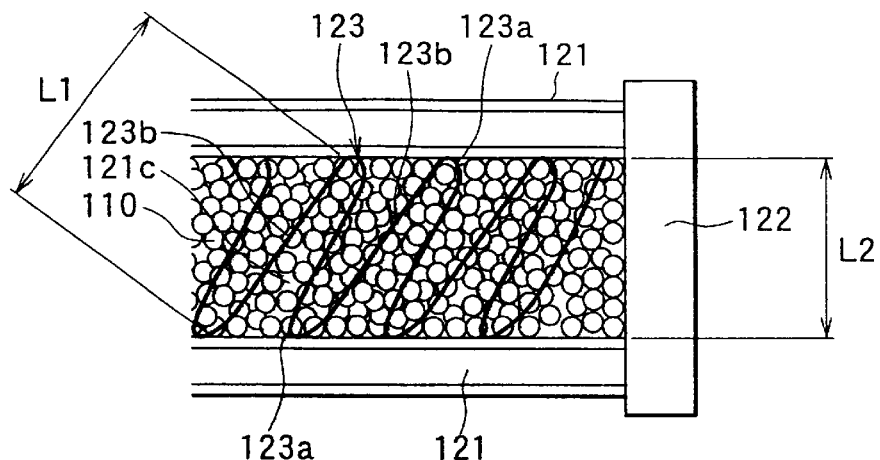
FIG. 4 is a partial side view showing the hydrogen occluding core (first embodiment)

As shown in FIG. 4, the fin 123 has a large number of fin curved sections 123a and plane sections 123b connecting the adjacent fin curved sections 123a in the shape of wave advancing in the longitudinal direction of the tube 121. The neighboring plane sections 123b are disposed in parallel from each other while inclining with respect to the tube 121 so that the length L of the plane section 123b is longer than the dimension L2 between the tubes 121. Here, the length L1 of the plane section 123b is the length between the neighboring fin curved sections 123a measured along the fin 123. It is noted that the volume change may be absorbed by the fin 123 when the relationship between L1 and L2 is L1 1.2×L2 when the coefficient of volume expansion is 20%.

According to the present embodiment, since the elastically deformable tube deforming section (tube curved section 121b) is provided in the tube 121, it is possible to absorb stress generated in the tube 121 by the occlusion and dissociation of hydrogen. Accordingly, because it is possible to prevent the tube 121 from being damaged, it is possible to improve the reliability and durability of the hydrogen occluding core 130.

Since the fin 123 is formed into the shape of wave and is jointed to the tube 121 at two different places of the outer surface of the tube 121, there has been a possibility that the dimensions (the dimension L2 between. the tubes 121) at the two different places jointed with the fin 123 expands and the fin 123 separates from the tube 121 when the tube deforming section (tube curved section 121b) deforms such that its radius of curvature (dimension of minor axis of the tube 121) becomes small in absorbing the stress generated in the tube 121 along the occlusion and dissociation of hydrogen.

However, the present embodiment can absorb the change of dimension (dimension L2 between the tubes 121) at two different places because the fin curved section 123a changes elastically so that its radius of curvature changes and functions as the fin deforming section which changes elastically in accordance to the change of dimension of the two different places when the dimension (dimension L2 between the tubes 121) of the two places changes.

Accordingly, it is possible to prevent the fin 123 from separating from the tube 121 even when the tube deforming section (tube curved section 121b) deforms such that its radius of curvature (the dimension of minor axis of the tube 121) becomes small in absorbing the stress generated in the tube 121 by the occlusion and dissociation of hydrogen.

Second Embodiment

Figure 5:
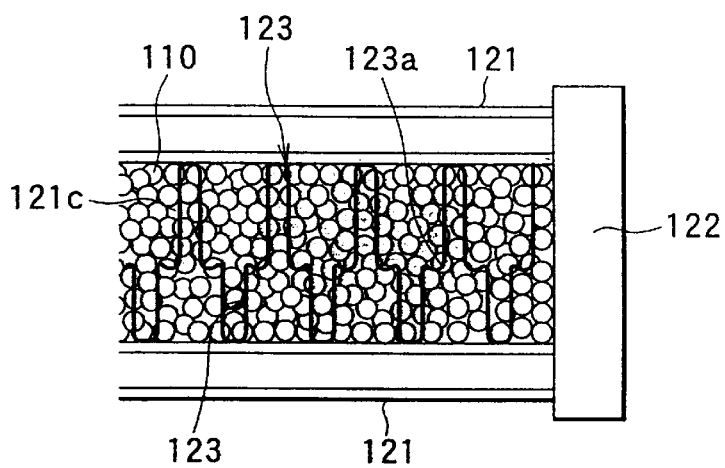
FIG. 5 is a partial side view showing a hydrogen occluding core (second embodiment)

In the first embodiment, the part of the fin 123 is curved to put into the shape of wave. Alternatively, according to the second embodiment, part of the plane section 123b is curved stepwise to give the quality of spring to the fin 123 as shown in FIG. 5.

Thereby, since the fin curved section 123a deforms elastically and functions as the fin deforming section similarly to the first embodiment, it is possible to prevent the fin 123 from separating from the tube 121 even when the tube deforming section (tube curved section 121b) deforms such that its radius of curvature (dimension of minor axis of the tube 121) becomes small.

Third Embodiment

In the first and second embodiments, the occluding member 110 has been filled in the space 121c between the tubes 121 across the whole range of the tube 121 in the longitudinal direction. Alternatively, according to the third embodiment, there is provided a non-filling section 121d where the occluding member 110 is not filled at the both ends of the tube 121 within the space 121c between the tubes as shown in FIGS. 6 and 7.

Figure 6:
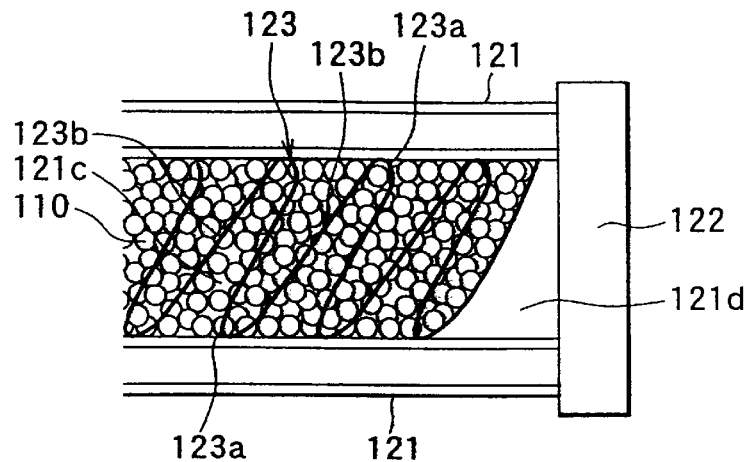
FIG. 6 is a partial side view showing a hydrogen occluding core (third embodiment)
Figure 7:
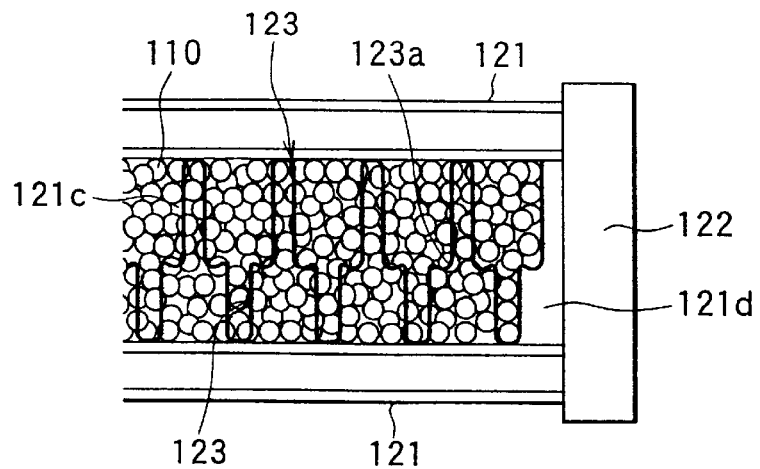
FIG. 7 is a partial side view showing the hydrogen occluding core (third embodiment)
Figure 8:
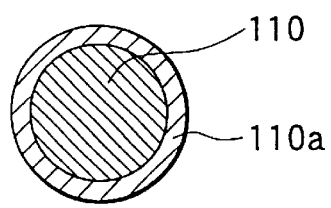
FIG. 8 is an enlarged view showing a hydrogen occluding core (fourth embodiment)

Here, FIG. 6 shows a case when the non-filling section 121d is provided in the hydrogen occluding core 130 in the first embodiment, and FIG. 7 shows a case when the non-filling section 121d is provided in the hydrogen occluding core 130 in the second embodiment.

Since the both ends of the tube 121 in the longitudinal direction are fixed to the header 122, the tube 121 may be considered as a beam whose both ends are fixed. Accordingly, when the occluding member 110 expands in the state in which the occluding member 110 is filled in the space 121c between the tubes 121 across the whole range of the tube 121 in the longitudinal direction, it becomes equal to the beam which receives the uniformly distributed load across the whole range of the tube 121 in the longitudinal direction and the largest bending moment (bending stress) occurs at the both ends of the tube 121 in the longitudinal direction.

However, since the non-filling section 121d in which the occluding member 110 is not filled is provided is provided at the both ends of the tube 121 in the longitudinal direction where the largest bending moment (bending stress) occurs in the present embodiment, it is possible to reduce the maximum stress occurring to the tube 121 and to prevent the tube 121 from being damaged.

Fourth Embodiment

In the above-described embodiments, the occluding member 110 has been filled directly into the space 121c between the tubes. Alternatively, according to the fourth embodiment, the occluding member 110 is filled in the space 121 between the tubes in the state in which the occluding member 110 is stored within a container 110a made of a material which does not occlude nor dissociate hydrogen by coating the outer surface of the occluding member 110 by copper alloy which does not occlude nor dissociate hydrogen. This coating film has no hydrogen occluding and dissociating actions, but it can transmit hydrogen.

Here, since the occluding member 110 is coated by the container (coating film) 110a, there is a possibility that the efficiency of heat exchange between the occluding member 110 and the heating medium drops. Accordingly, it is desirable to select one having large heat conductivity in selecting the material of the container (coating film) 110a.

The present embodiment prevents the occluding member 110 from falling from the space 121c between the tubes by eliminating a hydrogen transmitting film 124, by coating the occluding member 110 by copper and by jointing the neighboring coating films (containers 110a).

Thereby, since the volume of the container 110a barely changes with respect to the volume change of the occluding member 110, it is possible to weaken the stress occurring in the tube 121 due to the occlusion and dissociation of hydrogen.

Here, since the occluding member 110 expands and contacts by occluding and dissociating hydrogen, the surface area of the occluding member 110 expands/contracts along the occlusion and dissociation of hydrogen and the efficiency of heat exchange between the occluding member 110 and the heating medium changes.

However, in the present embodiment, it is possible to prevent the efficiency of heat exchange between the occluding member 110 and the heating medium from largely changing (when the occluding member 110 contracts in particular) because the occluding member 110 is coated by the container (coating film) 110a and the apparent surface area (surface area of the container (coating film) 110a) barely changes.

Fifth Embodiment

Figure 9:
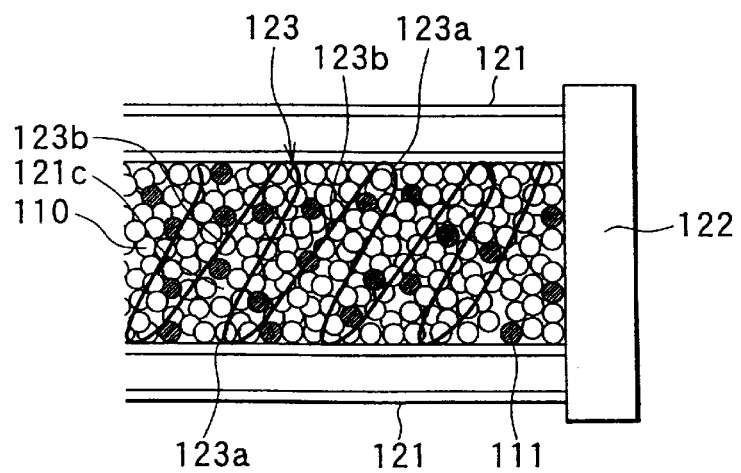
FIG. 9 is a partial side view showing a hydrogen occluding core (fifth embodiment)

In the first through third embodiments, only the occluding member 110 has been filled in the space 121c between the tubes. Alternatively, according to the fifth embodiment, the occluding member 110 is filled in the space 121c between the tubes together with elastically deformable elastic member (dummy member) 111 made from a porous elastic material having a large number of holes as shown in FIG. 9.

Thereby, since the volume change of the occluding member 110 may be absorbed by the elastic member 111 even when the occluding member 110 expands/contracts, it is possible to weaken (absorb) the stress occurring in the tube 121 due to the occlusion and dissociation of hydrogen.

Here, since the volume change of the occluding member 110 is absorbed by the elastic deformation of the elastic member 111 (dummy member), it is desirable to cause the volume ratio of the total amount of the elastic member 111 and that of the occluding member 110 to coincide with the rate of volume change of the occluding member 110. For example, when the rate of volume change of the occluding member 110 is 20%, it is desirable to set the total amount of the elastic member 111 at 20% as the volume ratio to the whole.

Sixth Embodiment

Figure 10:
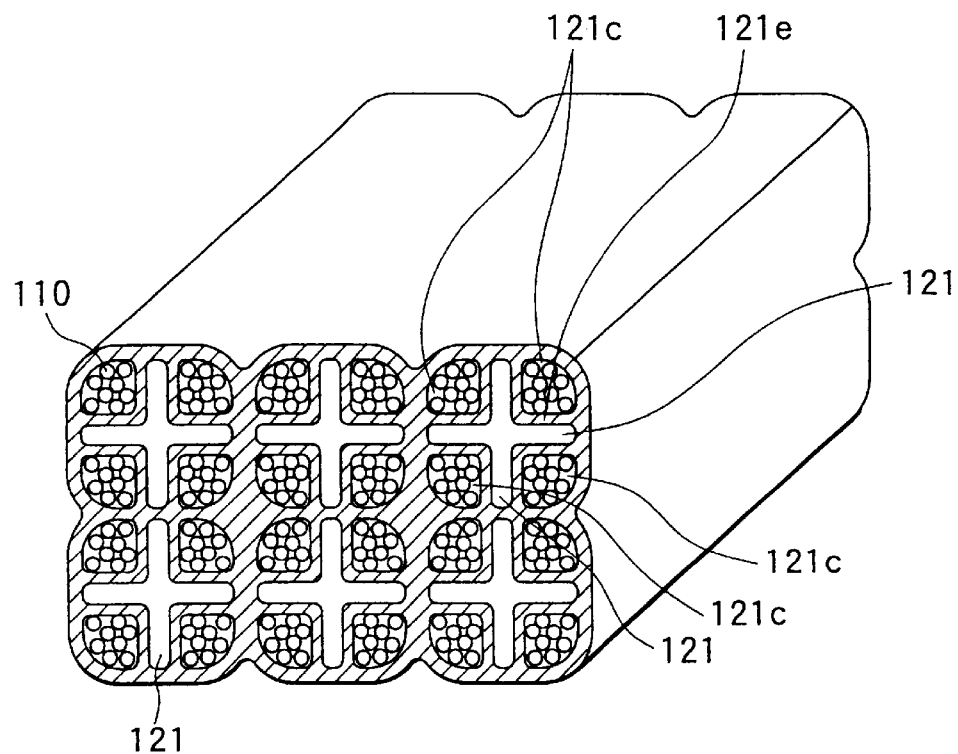
FIG. 10 is a perspective cross sectional view showing a hydrogen occluding core (sixth embodiment)
Figure 11:
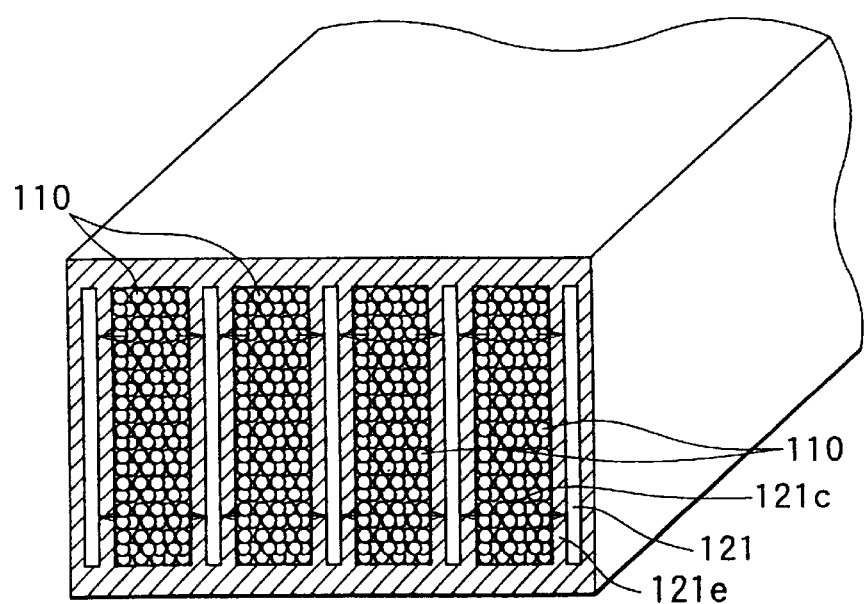
FIG. 11 is a perspective cross sectional view showing a hydrogen occluding core (sixth embodiment)

In the above-described embodiment, the hydrogen occluding core 130 has comprised the plurality of tubes 121 whose sectional profile is flat. Alternatively, according to the sixth embodiment, the tubes 121 through which the heating medium flows and the spaces 121c in which the occluding member 110 is filled are formed in a body by extrusion or drawing as shown in FIGS. 10 and 11, and the thickness of partition walls (tube deforming section) 121e parting the tube 121 from the space 121c is thinned as compared to the other parts so as to be elastically deformable.

Modifications

In the first through fifth embodiment, the hydrogen occluding core 130 has had the fin 123. Alternatively, the fin 123 may be eliminated in the invention.

The present invention is not also limited only to the hydrogen occluding core 130 shown in the embodiments described above, and may be applied to one in which all of the embodiments are combined, one in which the tube deforming section is provided merely in the tube, one in which the quality of spring is given to the fin 123, one in which the non-filling section is merely provided, one in which the occluding member 110 is stored merely in the container 110a made of a material which does not occlude nor dissociate hydrogen, or one in which the occluding member is filled with the elastic member (dummy material).

Furthermore, the hydrogen occluding core 130 has comprised the multi-flow type heat exchanger 120 having the plurality of tubes 121 formed linearly. The invention is not limited only to that, and the hydrogen occluding core may be one comprising a serpentine type heat exchanger in which a tube meanders. Well known hydrogen occluding member may be applied as a matter of course, for example, FeTe may be used.

In the above-described embodiments, the present invention is applied to the hydrogen supply system for supplying hydrogen to the warming heater 300 as the hydrogen supply system having the inventive hydrogen occluding core. Alternatively, the present invention may be applied to other hydrogen supply systems such as a hydrogen supply system of fuel battery that causes electric power by chemically reacting hydrogen with oxygen.

Seventh Embodiment

Figure 12:
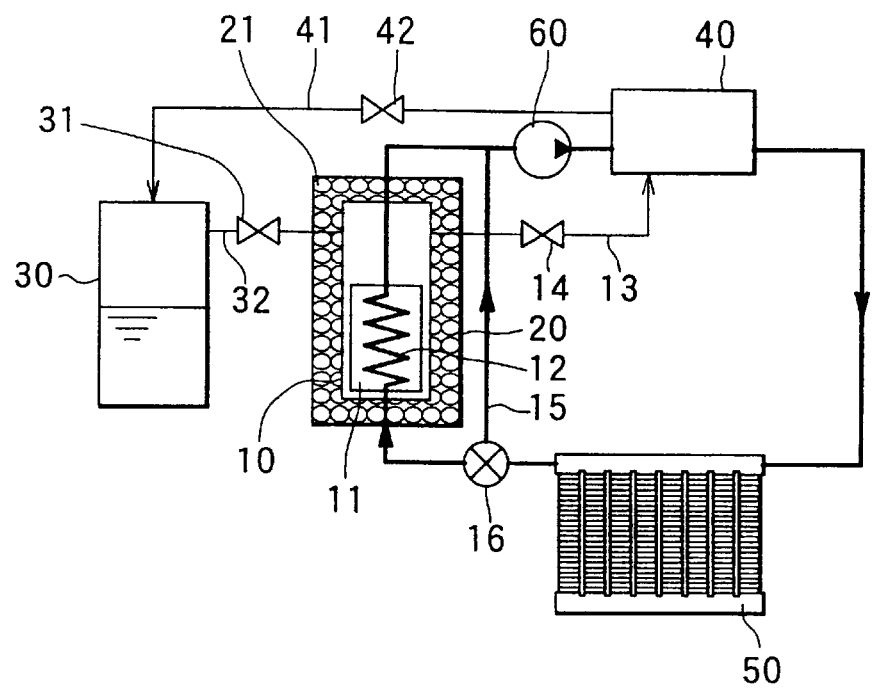
FIG. 12 is a schematic view showing a hydrogen supply system (seventh embodiment)

The present seventh embodiment is applied to a vehicle heating system using a burning type heater, and FIG. 12 is a schematic view showing the vehicular heating system of the present embodiment.

In FIG. 12, the reference numeral 10 denotes an occlusion tank in which occluding member 11 occluding and dissociating hydrogen is stored. The occlusion tank 10 is stored within an absorbent tank 20 in which adsorbent 21 is filled. Here, the adsorbing member 21 is what generates heat in adsorbing adsorption medium in the gaseous state (water in the present embodiment) and desorbs the adsorption medium as it is heated. Silica gel is adopted as the adsorbing member 21 in the present embodiment. Therefore, when the adsorbing member 21 generates adsorption heat, the occluding member 11 is heated by the adsorption heat supplied from the adsorbing member 21 existing around the outer wall of the occlusion tank 10.

Here, the occlusion tank 10 and the adsorbing member tank 20 are both made from stainless steel by taking thermal conductivity into account.

The reference numeral 30 denotes a medium tank for storing the adsorption medium, and the reference numeral 31 denotes a first valve for opening/closing a communication passage (pipe) for communicating the medium tank 30 with the adsorbing member tank 20. The reference numeral 40 denotes a burning type heater for generating heat by burning hydrogen supplied from the occlusion tank 10, and the reference numeral 50 denotes a heater core (warming heater exchanger) for heating air blown out to the cabin by using the heating medium (fluid in which ethylene glycol anti-freezer is mixed with water) heated by the heater 40 as a heat source. Here, the medium tank 30 is mounted at the part exposed to wind caused in running the vehicle or to radiator cooling air.

The reference numeral 41 denotes a heating exhaust pipe for heating the absorption medium (water) within the medium tank 30 by heating the outer wall of the medium tank 30 by guiding combustion exhaust gas of the heater 40, and the reference numeral 42 denotes a second valve for opening/closing the heating pipe 41.

A heat exchanger (occluding member) 12 for heat-exchanging between the heating medium (hot water) flown out of the heater 40 and the occluding member 11 is provided within the occlusion tank 10. The heating medium is circulated among the heat exchanger 12, the heater 40 and the heater core 50 by a pump 60. Here, the detail of the heat exchanger 12 has been explained with reference to FIGS. 2 through 4 in the first embodiment.

Here, the reference numeral 13 denotes a hydrogen pipe for supplying hydrogen gas within the occlusion tank 10 to the heater 40. The reference numeral 14 denotes a third valve for opening/closing the hydrogen pipe 13, and the reference numeral denotes a bypass passage for guiding the heating medium flown out of the heater core 50 to the heater 40 (at the side of the pump 60 where the heating medium flows in) by bypassing the heat exchanger 12. The reference numeral 16 denotes a fourth valve for controlling a flow rate of the heating medium flown to the heat exchanger 12.

Next, characteristic operations of the present embodiment will be explained.

1. Stationary Operation Mode:

This stationary operation mode is carried out when enough amount of gaseous hydrogen (hydrogen gas) for continuously operating the heater 40 for a predetermined time exists within the occlusion tank 10. In this mode, the heater 40 is started by opening the third valve 14, by closing the first and second valves 31, 42, and by operating the pump 60.

Thereby, since the heating medium heated by the heater 40 flows into the heater core 50, the air blown into the interior of the car is warmed up and the occluding member 11 as well as the adsorbing member 21 is heated. Then, hydrogen occluded to the occluding member 11 desorbs and the absorption medium that has been adsorbed in the adsorbing member 21 desorbs as gaseous adsorption medium (vapor).

Here, the predetermined time described above has been set based on time and the like for desorbing an enough quantity of hydrogen for continuously operating the heater 40 by heat of the heating medium flown out of the heater 40.

The quantity of hydrogen to be supplied to the heater 40 is controlled by controlling an opening of the third valve 14 and the control of the heating degree of the occluding member 11 is made by controlling a flow rate of the heating medium flown into the heat exchanger 12 by the fourth valve 16.

Here, since the first valve 31 is closed, there is a possibility that the vapor desorbed from the adsorbing member 21 is adsorbed to the adsorbing member 21 again when the desorption of the absorption medium advances and the pressure within the adsorbing member tank 20 rises.

Then, when the pressure within the adsorbing member tank reaches to predetermined pressure or more, the first valve 31 is opened to return the vapor to the medium tank 30. It is noted that because the medium tank 30 is exposed to wind caused in running the vehicle or to radiator cooling water, the vapor returned to the medium tank 30 is cooled and condensed.

2. Low Temperature Time Operation Mode:

This low temperature time operation mode is a mode that is carried out when the temperature of the occluding member 11 is low and no enough hydrogen gas for continuously operating the heater 40 by a predetermined time exists within the occlusion tank 10. The heater 40 is started by opening the first and third valves 31 and 14 and by operating the pump 60.

Thereby, since the gaseous absorption medium (vapor) supplied from the medium tank 30 is adsorbed to the adsorbing member 21, the occluding member 11 is heated by adsorption heat and desorbs and emits hydrogen that has been occluded.

Here, when the occluding member 11 is heated by the adsorption heat and an enough quantity of hydrogen is generated and when the temperature of the heating medium flowing into the heat exchanger 12 rises and it becomes unnecessary to heat the occluding member 11 by the adsorption heat after igniting and starting the heater 40, the mode is shifted to the normal operation mode described above.

3. Excessive Low Temperature Operation Mode:

This excessive low temperature operation mode is a mode carried out when the outside air is low and it is unable to supply the gaseous adsorption medium (vapor) from the medium tank 30 to the adsorbing member 21.

Foe example, the third valve 13 is opened to supply the hydrogen gas existing within 10 to the heater 40 to ignite and start the heater 40, the second valve 42 is opened to heat the medium tank 30 by combustion exhaust gas of the heater 40 and then the first valve 31 is opened.

Thereby, the gasification of the liquid or solid phase absorption medium within the medium tank 30 is accelerated and the gaseous absorption medium (vapor) is supplied to the adsorbing member 21. Further, since the vapor pressure of the absorption medium rises, the adsorption of moisture of the adsorbing member 21 is accelerated and adsorption heat is generated. Thus, the occluding member 11 may be heated.

Here, the mode is shifted to the normal operation mode described above when an enough quantity of hydrogen is desorbed from the occluding member 11, the temperature of the heating medium flowing into the heat exchanger 12 rises and it becomes unnecessary to heat the occluding member 11 by the adsorption heat.

Next, the characteristic points of the present embodiment will be described.

According to the present seventh embodiment, the occluding member 11 is heated by the adsorption heat generated when the adsorbing member 21 adsorbs the absorption medium, it is possible to heat the occluding member 11 simply and readily as compared to the case of heating the occluding member 11 by the electrical heater or by hot water stored in the temperature insulating tank. Accordingly, because the occluding member 11 may be heated reliably without increasing the size of the hydrogen supply system and without increasing the production cost, it becomes possible to supply hydrogen stably at low cost.

Since the adsorbing member 21 generates absorption heat in adsorbing vapor, holding the vapor is equal to storing heat of the total quantity of absorption heat generated in adsorbing the held vapor. Here, since the absorption heat generated in adsorbing water by silica gel is almost equal to latent heat of evaporation of water (2450 kJ/kg), it is possible to store the quantity of heat more effectively as compared to the case of storing the quantity of heat for heating the occluding member 11 by the sensible heat (4.19 kJ/kg) of water within the temperature insulating tank in the present embodiment.

Further, when the outside temperature is low and it is unable to supply the gaseous absorption medium (vapor) from the medium tank 30 to the adsorbing member 21, it is possible to generate absorption heat reliably by the adsorbing member 21 even when the outside temperature is low because the absorption medium is heated by the combustion exhaust gas of the heater 40 and the vapor pressure is increased by accelerating gasification of the absorption medium.

Here, since the melting latent heat of water (335 kJ/kg) is smaller than the absorption heat (2450 kJ/kg), it is possible to assure the quantity of heat (to store heat) for heating the occluding member 11 even if heat is supplied to melt water.

Further, since the vapor (gaseous am) desorbed from the adsorbing member 21 in the normal operation mode may be stored within the adsorbing member tank 20, the stored vapor may be utilized as heat source for heating the occluding member 11 next time. Accordingly, it is possible to store the quantity of heat more effectively as compared to the case of storing the quantity of heat for heating the occluding member 11 by the temperature insulating tank.

Since the adsorption member (silica gel) for adsorbing absorption medium (water) by physical adsorption of adsorbing a material by van der Waals force is adopted in the present embodiment, the quantity of heat necessary for regenerating the adsorption member (desorb and emit adsorbed coolant) may e lessened as compared to an adsorption member of chemical adsorption which generates chemical compound such as ammonium which adsorbs (absorbs) water. Accordingly, energy required for operating the hydrogen supply system 100 may be lessened.

100 cc of silica gel and 14 cc of water are necessary for raising the temperature of hydrogen occluding member of 1 kg by 10° C. This may be easily attained by specific heat of the hydrogen occluding member, the water adsorbing latent heat of silica gel and others. Accordingly, a required amount of silica gel and water may be designed by taking various conditions such as the weight of hydrogen occluding member and the required increase of temperature into account.

Eighth Embodiment

Figure 13:
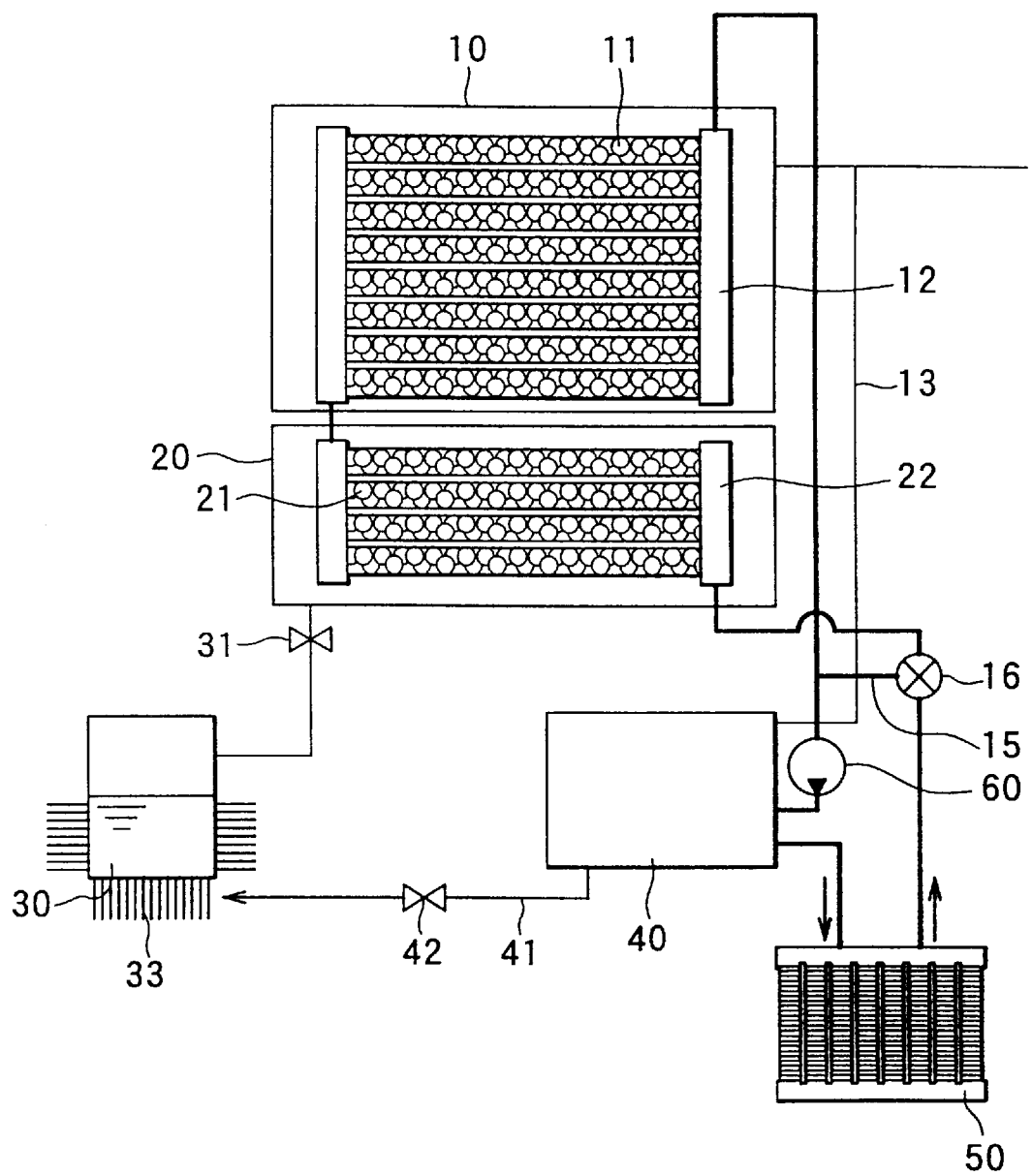
FIG. 13 is a schematic view showing a hydrogen supply system (eighth embodiment)

In the eighteenth embodiment, as shown in FIG. 13, the absorption heat is supplied to the occluding member 11 by circulating heating medium between a heat exchanger (adsorption core) 22 in which the adsorbing member 21 is adhered (bonded) to the surface and the heat exchanger (occlusion core). It is noted that the heating medium circulates in order of the heat exchanger (adsorption core) 22, the heat exchanger (occlusion core) 12, the heater 40, the heater core 50 and the heat exchanger (adsorption core) 22.

Thereby, it is possible to reduce the production cost of the hydrogen supply system by commonly using the components of the both heat exchangers 12 and 22 by constructing the both heat exchangers 12 and 22 in the same manner. Here, the components of the both heat exchangers 12 and 22 mean a plurality of tubes through which the heating medium flows, header tanks which are disposed at the both ends of those tubes to communicate with the respective tube, and others.

In the present embodiment, a fin 33 for accelerating cooling of the medium tank 30 by increasing the surface area is provided on the surface of the medium tank 30.

Modifications

According to the above described seventh and eighth embodiment, the adsorbing member that adsorbs absorption medium (water) by physical adsorption of adsorbing a material by Van der Waals force. However, the invention is not limited to such case and may be applied to chemical adsorption of generating chemical compound such as ammonium that adsorbs (absorbs) water.

According to the above described seventh and eighth embodiment, the invention has been applied to the hydrogen supply system for supplying hydrogen to the heating heater 40. Alternatively, the present invention may be applied to other hydrogen supply systems such as a hydrogen supply system of fuel battery, which causes electric power by causing chemical reaction of hydrogen and oxygen.

According to the above described seventh and eighth embodiment, the heater 40 that burns hydrogen has been adopted as heating means for heating and gasificating the absorption medium. However, the present invention is not limited to such case, and a combustion type heater that burns other fuels such as gasoline and light oil may be adopted.

According to the above described seventh and eighth embodiment, the heater 40 has been used as heating means for heating and gasificating the absorption medium. However, the invention is not limited to such case and other heat such as an engine (internal combustion engine), and fuel battery and waste heat of semiconductor devices may be used as the heat source.

According to the above described seventh and eighth embodiment, silica gel has been used as the adsorbing member 21. However, the invention is not limited to such case, and activated carbon, zerolite, activated alumina and the like may be used as the adsorbing member 21. In this case, it is desirable to use one in which the difference between absorption heat and regenerated heat (quantity of heat required for regeneration) is least.

According to the above described seventh and eighth embodiment, water has been used as the absorption medium. However, the invention is not limited to such case and other materials such as alcohol and fleon that are adsorbed by the adsorbing member may be used.

Ninth Embodiment

Figure 14:
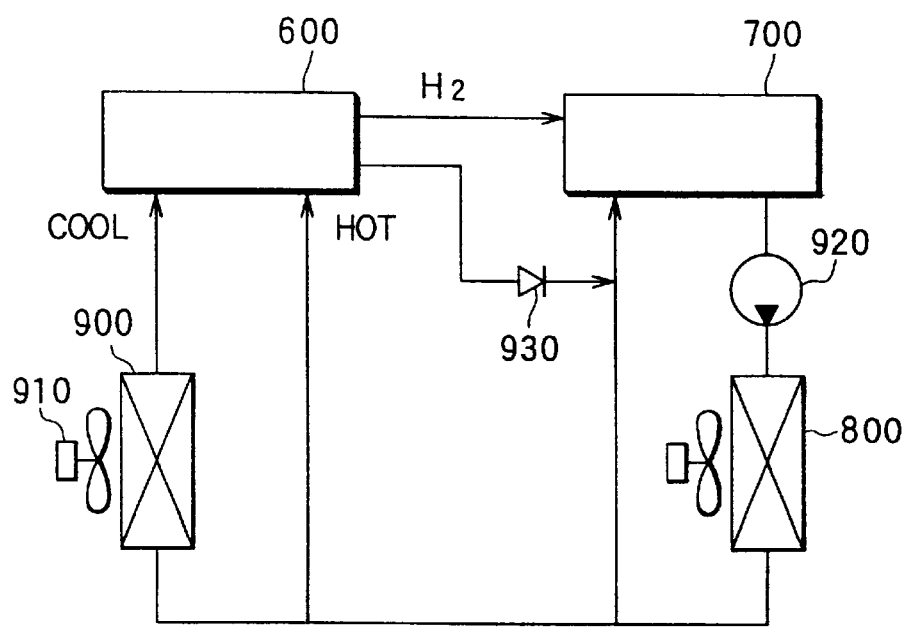
FIG. 14 is a schematic view showing a heating system using a hydrogen supply system (ninth embodiment)

FIG. 14 is a schematic view showing of the vehicle heating system of the ninth embodiment.

In FIG. 14, the reference numeral 600 denotes the hydrogen supply system of the present embodiment. The reference numeral 700 denotes a burning type heater (hereinafter referred to as a heater) for generating heat by burning hydrogen supplied from the hydrogen supply system 600. The reference numeral 800 denotes a heater core for heating air blown out to an interior of the car by using heating medium (fluid in which ethylene glycol anti-freezing fluid is mixed with water in the present embodiment) heated by the heater 700.

The reference numeral 900 denotes a radiator for cooling the heating medium flown out of the heater core 800. It drops the temperature of the heating medium flown out of the radiator 900 by controlling a quantity of blown air of a radiator fan (cooling blower) 910.

The reference numeral 920 denotes a pump for circulating the heating medium, and the reference numeral 930 denotes a check valve for preventing the heating medium flown out of the hydrogen supply system 600 from flowing back to the hydrogen supply system 600.

Next, the hydrogen supply system 600 of the present embodiment will be described.

Figure 15:
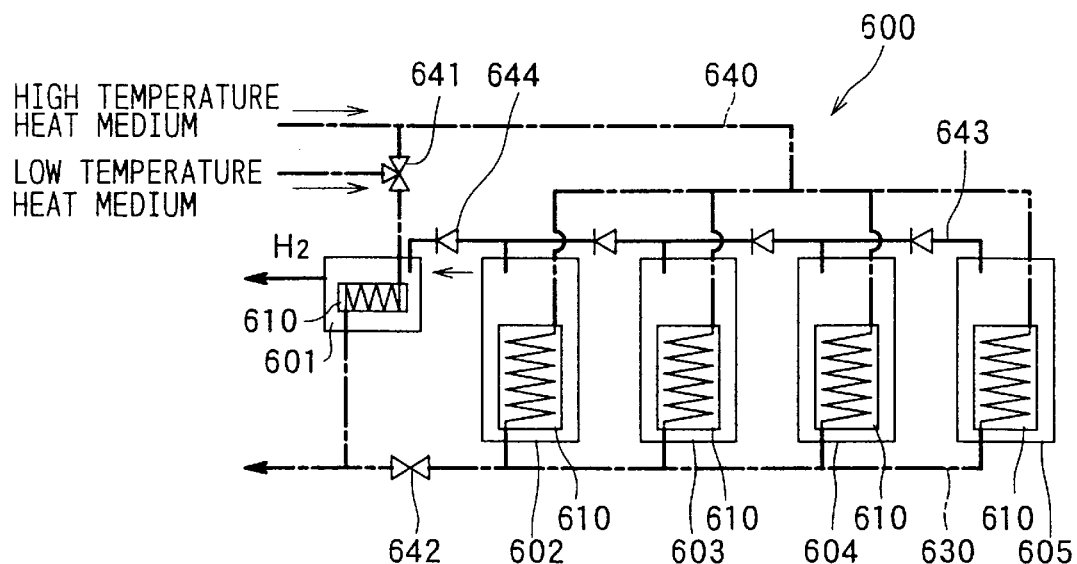
FIG. 15 is a schematic view showing an occlusion tank (ninth embodiment)
Figure 16:
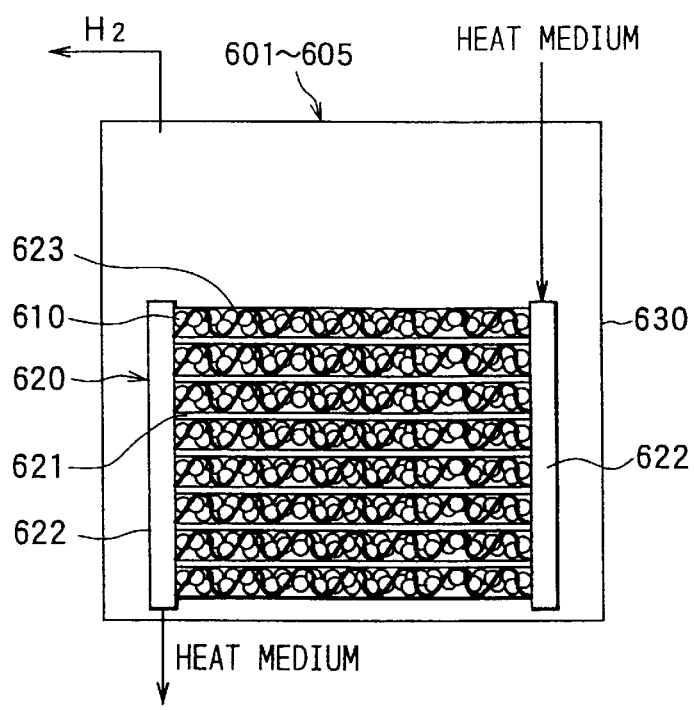
FIG. 16 is a schematic view showing the hydrogen supply system (ninth embodiment)

In FIG. 15, the reference numerals 601 through 605 denote first through fifth hydrogen occluding member tanks (hereinafter referred to as an occlusion tank) in which hydrogen occluding member (hereinafter referred to as occluding member) 610 that occludes and dissociates hydrogen is stored. Each of these first through fifth hydrogen occluding member tanks 601 through 605 includes a heat exchanger 620 for heat-exchanging between the occluding member 610 and heating medium, a casing 630 for storing the occluding member 610 and the heat exchanger 620, and others as shown in FIG. 16.

The heat exchanger 620 is a multi-flow type heat exchanger including a plurality of tubes 621 through which the heating medium flows, header tanks 622 disposed at the both ends of the tubes 621 in the longitudinal direction and communicating with the plurality of tubes 621 and fins 623 disposed between the respective tubes 621 to accelerate heat exchange between the heating medium and the occluding member 610. The heat exchanger 620 in which the occluding member 610 is filled will be called as a hydrogen occluding core. The detail of the heat exchanger 620 has been explained in the first embodiment with reference to FIGS. 2–4.

Here, while the dissociation equilibrium pressure of the occluding member 610 is determined uniquely with respect to the temperature of the occluding member itself as is well known, the dissociation equilibrium pressure with respect to the same temperature differs per type of occluding member. When the dissociation equilibrium pressure is different with respect to the equal temperature, it will be referred to as "the hydrogen occluding physical characteristics is different" and when the dissociation equilibrium pressure is equal with respect to the equal temperature, it will be referred to as "the hydrogen occluding physical characteristics is equal" in the present specification. In the present embodiment, the occluding member 610 stored in the first through fifth hydrogen occluding member tanks 601–605 is the same type of occluding member whose hydrogen occluding physical characteristics is the same.

The dot chain line in FIG. 15 denotes a heat medium circuit 640 through which the heating medium which is circulated to the heat exchanger 620 (hydrogen occluding core) within the respective first through fifth hydrogen occluding member tanks 601 through 605 flows. The reference numeral 641 denotes a three-way change-over valve for switching and controlling cases of circulating the hot heating medium (the heating medium not cooled by a radiator 900) to the heat medium circuit 640 (the respective first through fifth hydrogen occluding member tanks 601 through 605) and of circulating the cold heating medium (the heating medium cooled by the radiator 900). The reference numeral 642 denotes a control valve for controlling the heating medium circulating through (the heat exchanger 620 of) the second through fifth occlusion tanks.

The thick solid line in FIG. 15 shows a hydrogen pipe (hydrogen passage) 643 for collecting and recovering hydrogen (hydrogen gas) dissociated within the second through fifth occlusion tanks 602 through 605 to guide to the first occlusion tank 601. Therefore, hydrogen within the first occlusion tank 601 is supplied to the outside (a heater 700 in the present embodiment) as supplied hydrogen in the hydrogen supply system 600 of the present embodiment.

Here, check valves 644 for allowing hydrogen to flow toward the first occlusion tank 601 which supplies hydrogen to the outside and for blocking hydrogen to flow from the first occlusion tank 601 to the fifth occlusion tank 605 are provided between the respective occlusion tanks 601–605 in the hydrogen pipe 643.

Next, the operation of the present embodiment will be described.

Figure 17:
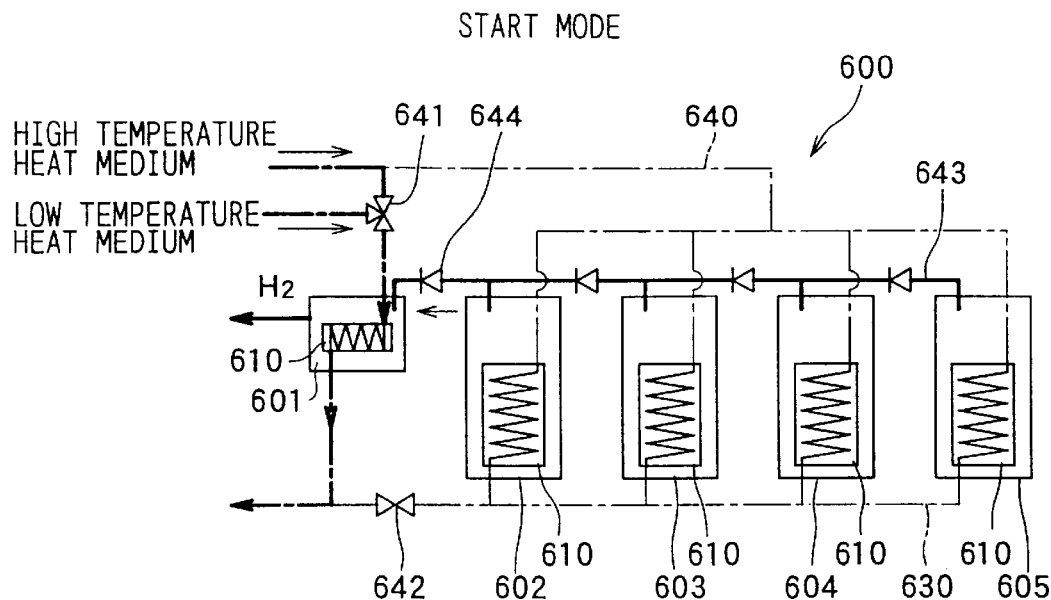
FIG. 17 is a schematic view in starting of the hydrogen supply system (ninth embodiment)

1. Starting Time Mode:

This mode is what is carried out in starting to supply hydrogen by the hydrogen supply system 600. The change-over valve 641 is actuated to circulate the hot heating medium to the first occlusion tank 601 and the control valve 642 is closed to stop the heating medium from circulating to the second through fifth occlusion tanks 602–605 as shown in FIG. 17.

Thereby, since the temperature of the occluding member 610 within the first occlusion tank 601 rises and the dissociation equilibrium pressure rises, hydrogen is dissociated and emitted from the occluding member 610 so that the pressure within the first occlusion tank 601 is equalized to the dissociation equilibrium pressure and hydrogen is supplied to the heater 700.

2. Stationary Time Mode:

This mode is what is executed after a predetermined time has passed (in the starting time mode) from the start of the supply of hydrogen to the outside (heater 700). The predetermined time is adequately selected based on time and others until when the pressure within the first occlusion tank 601 drops to predetermined pressure or below as the quantity of hydrogen dissociated and emitted from the first occlusion tank 601 drops.

Figure 18:
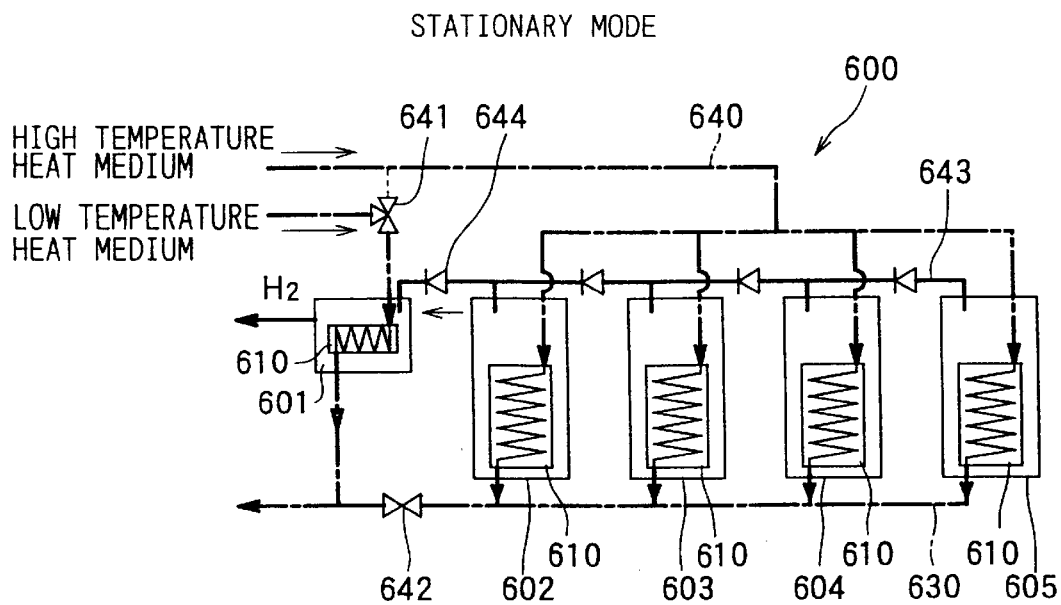
FIG. 18 is a schematic view in stationary time of the hydrogen supply system (ninth embodiment)

In this mode, as shown in FIG. 18, the change-over valve 641 is actuated to circulate the cold heating medium to the first occlusion tank 601 and the control valve 642 is opened to circulate the hot heating medium through the second through fifth occlusion tanks 602–605.

Thereby, since the temperature of the occluding member 610 within the second through fifth occlusion tanks 602–605 rises and the dissociation equilibrium pressure rises, hydrogen is dissociated and emitted from the occluding member 610 so that the pressure within the second through fifth occlusion tanks 602–605 is equalized with the dissociation equilibrium pressure and the dissociated and emitted hydrogen is guided to the first occlusion tank 601.

Meanwhile, since the cold heating medium is supplied to the first occlusion tank 601, the dissociation equilibrium pressure of the occluding member 610 within the first occlusion tank 601 drops below the dissociation equilibrium pressure of the occluding member 610 within the second through fifth occlusion tanks 602–605 and the hydrogen guided from the second through fifth occlusion tanks 602–605 is occluded so that the pressure within the first occlusion tank 601 is equalized with the dropped dissociation equilibrium pressure.

However, since the quantity of hydrogen guided from the second through fifth occlusion tanks 602–605 to the first occlusion tank 601 is greater than the quantity of hydrogen occluded by the occluding member 610 within the first occlusion tank 601, a part of hydrogen guided from the second through fifth occlusion tanks 602–605 to the first occlusion tank 601 is occluded by the occluding member 610 within the first occlusion tank 601 and the other part of hydrogen is supplied to the outside (heater 700).

Then, the first occlusion tank 601 will be called as a starting tank and the second through fifth occlusion tanks 602 through 605 will be called as stationary time tanks in the present embodiment.

Next, the characteristic points of the present embodiment will be described.

According to the present embodiment, since the hydrogen is guided from the stationary time tanks (second through fifth occlusion tanks) 602–605 to the starting tank (first occlusion tank) 601 and a part of the guided hydrogen is occluded by the occluding member 610 within the starting tank 601, the occluding member 610 within the first occlusion tank 601 can occlude an enough quantity of hydrogen and can supply hydrogen always stably.

Further, according to the present embodiment, the volume of the starting tank 601 is set smaller than the volume of the stationary time tanks 602–605 so that the internal pressure (hydrogen gas pressure) of the starting tank 601 can be boosted readily while suppressing it from dropping.

Tenth Embodiment

Figure 19:
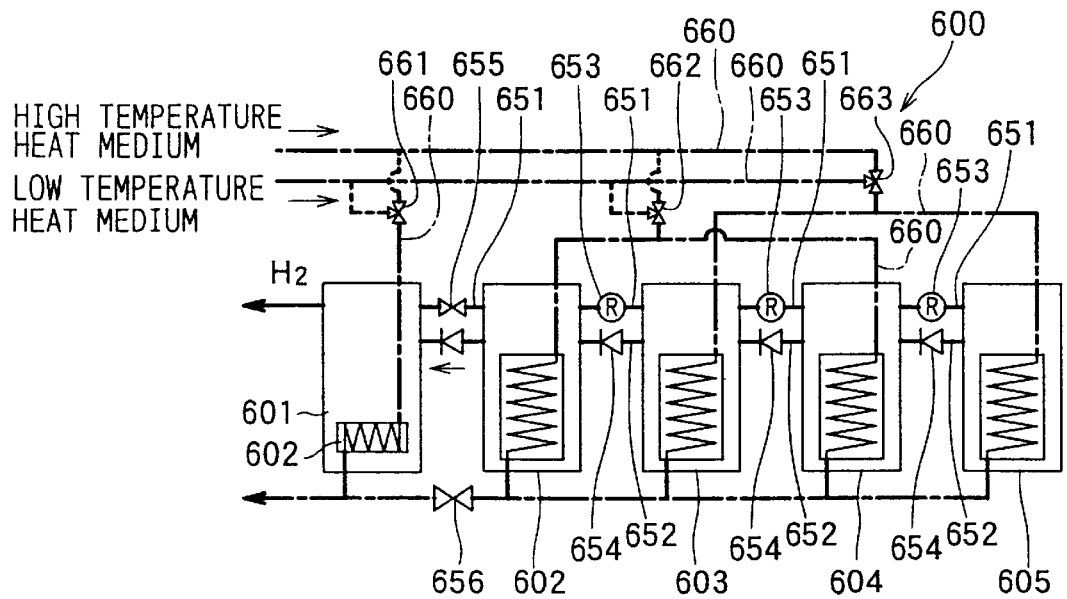
FIG. 19 is a schematic view showing a hydrogen supply system (tenth embodiment)

FIG. 19 is a schematic view showing a hydrogen supply system of the present embodiment. In the present embodiment, the respective first through fifth hydrogen occluding member tanks 601–605 are arranged so that occluding member of which dissociation equilibrium pressure with respect to the equal temperature is the lowest (hereinafter, this dissociation equilibrium pressure will be called as temperature dissociation equilibrium pressure) is stored in the fifth occlusion tank 605 and occluding member whose temperature dissociation equilibrium pressure is highest is stored in the first occlusion tank 601, i.e., in order of the temperature dissociation equilibrium pressure.

The neighboring occlusion tanks 601–605 are communicated through two hydrogen pipes 651 and 652. A regulator 653 controlling the difference of pressure among the neighboring occlusion tanks 601–605 (except of the part between the first occlusion tank 601 and the second occlusion tank 602) so that it is adjusted to predetermined pressure is disposed in one hydrogen pipe 651 and check valves 654 for allowing hydrogen to flow only toward the first occlusion tank 601 and for blocking hydrogen to flow from the first occlusion tank 601 to the fifth occlusion tank 605 are provided in the other hydrogen pipe 652.

A control valve 655 controlling the state of communication of the hydrogen pipe 651 is provided in the hydrogen pipe 651 between the first occlusion tank 601 and the second occlusion tank 602. A control valve 656 controls the heating medium circulating through (the heat exchangers 620 of) the second through fifth occlusion tanks 602–605.

A heating medium circuit 660 supplies the heating medium to the respective occlusion tanks 601–605 and first through third change-over valves 661–663 switch the heating medium to be supplied to the respective occlusion tanks 601–605 to differentiate the temperature of the occluding member 610 within the neighboring occlusion tanks 601–605 and to reverse the difference of those different temperatures periodically. Temperature control means for controlling the temperature of the occluding member 610 includes the change-over valves 661–663 and the heating medium circuit 660.

Next, the operation of the present embodiment will be described.

Figure 20:
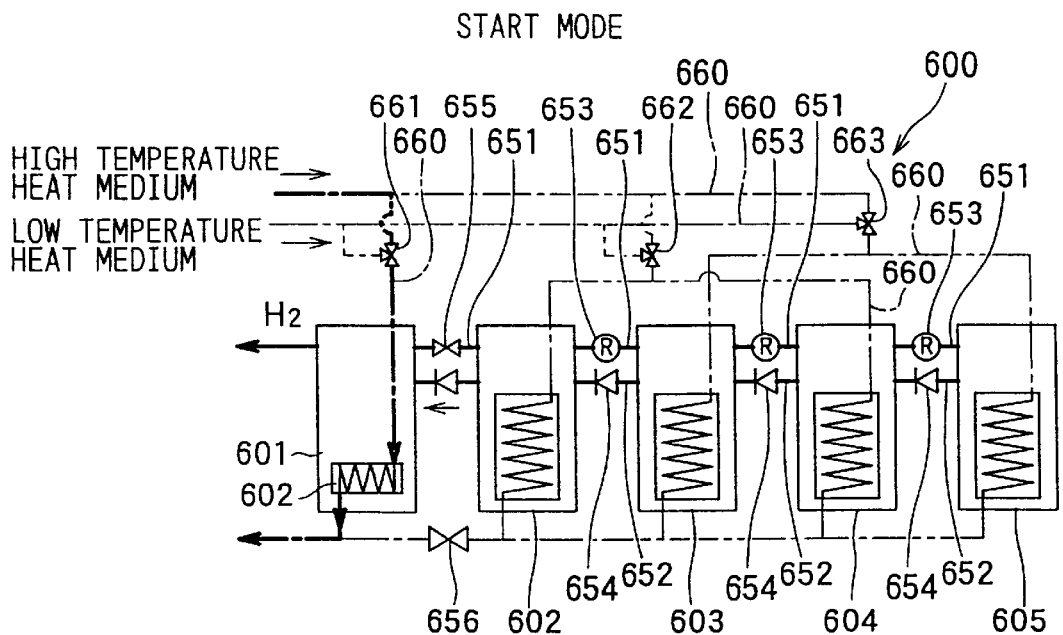
FIG. 20 is a schematic view in starting of the hydrogen supply system (tenth embodiment)

1. Starting Time Mode:

This mode is what is carried out in starting to supply hydrogen by the hydrogen supply system 600. The first change-over valve 661 is actuated to circulate the hot heating medium to the first occlusion tank 601 and the control valve 656 is closed to stop the heating medium from circulating to the second through fifth occlusion tanks 602–605 as shown in FIG. 20.

Thereby, the temperature of the occluding member 610 within the first occlusion tank 601 rises and the dissociation equilibrium pressure rises, so that hydrogen is dissociated and emitted from the occluding member 610 so that the pressure within the first occlusion tank 601 is equalized to the dissociation equilibrium pressure and hydrogen is supplied to the heater 700.

Figure 21:
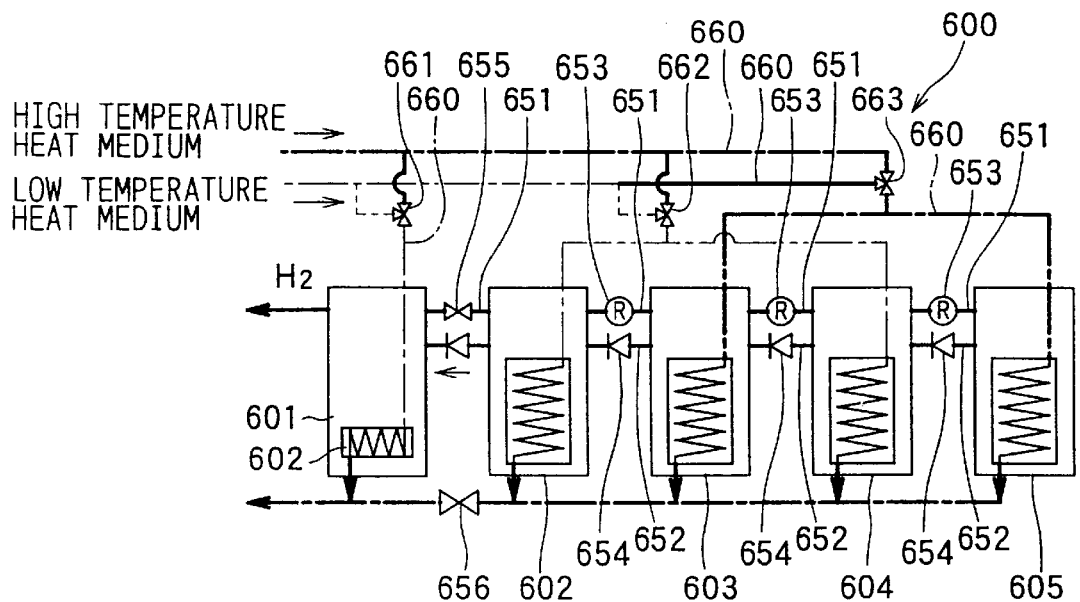
FIG. 21 is a schematic view in first stationary time of the hydrogen supply system (tenth embodiment)

2. Stationary Time Mode:

This mode is what is executed after when a predetermined time has elapsed (in the starting time mode) from the start of the supply of hydrogen to the outside (heater 700). The first change-over valve 661 is actuated to circulate the cold heating medium to the first occlusion tank 601 and the control valve 656 is opened to circulate the heating medium through the second through fifth occlusion tanks 602–605 as shown in FIG. 21.

Te heating medium circulated through the second through fifth occlusion tanks 602–605 reverses the difference of different temperatures periodically by circulating heating medium whose temperature is different to the neighboring occlusion tanks so that the temperature of the neighboring first through fifth hydrogen occluding member tanks 601–605 is differentiated and by periodically switching the cases of circulating the hot heating medium and of circulating the cold heating medium.

Figure 22:
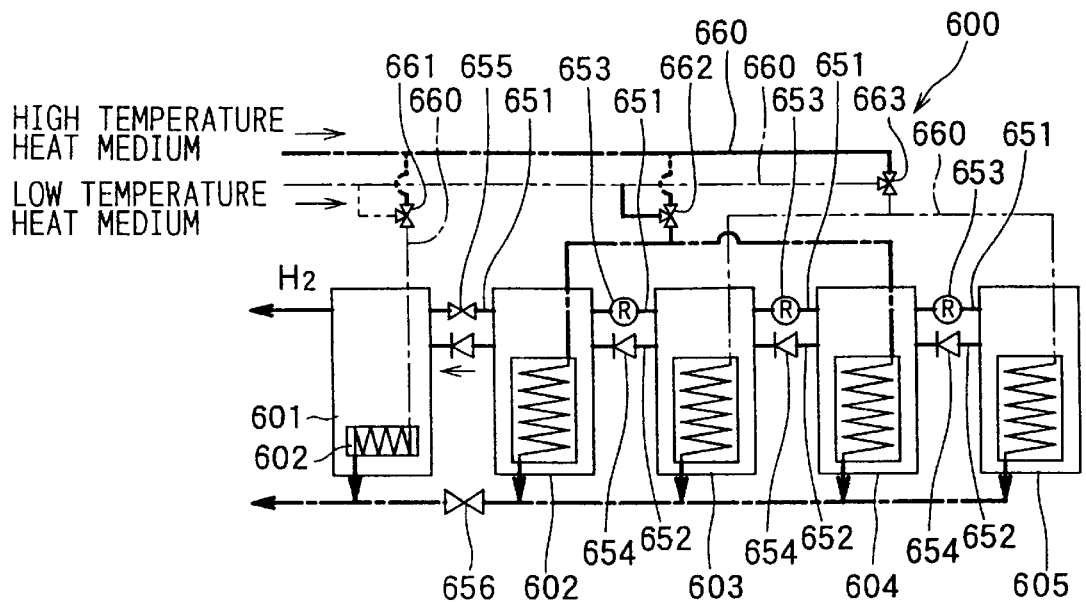
FIG. 22 is a schematic view in second stationary time of the hydrogen supply system (tenth embodiment)

For example, the cold heating medium is circulated through the second and fourth occlusion tanks 602 and 604 in circulating the hot heating medium through the third and fifth occlusion tanks 603 and 605 (this case will be called as first stationary time hereinafter) and the cold heating medium is circulated through the third and fifth occlusion tanks 603 and 605 in circulating the hot heating medium through the second and fifth occlusion tanks 602 and 604 (this case will be called as second stationary time hereinafter) as shown in FIG. 22.

Figure 23:
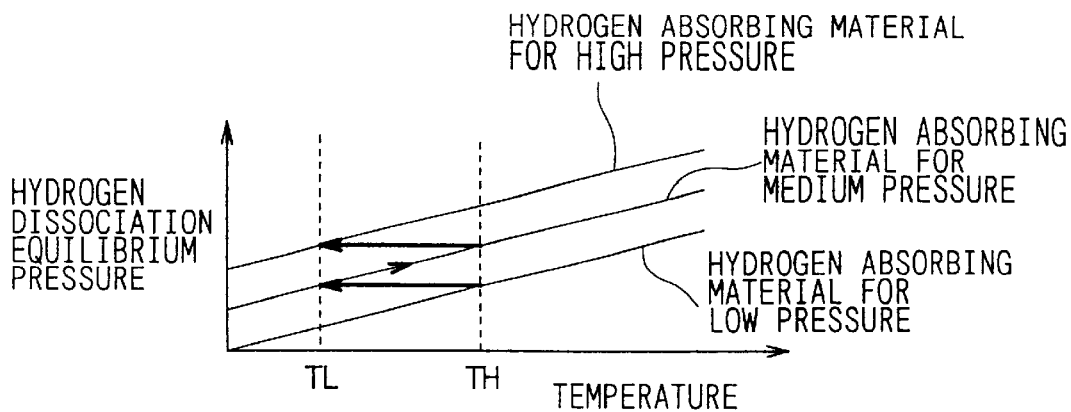
FIG. 23 is a graph showing a relationship between dissociation equilibrium pressure and temperature of occluding member (tenth embodiment)

Thereby, the dissociation equilibrium pressure of the occluding member 610 within the third and fifth occlusion tanks 603 and 605 rises in the first stationary time as shown in FIG. 23, and hydrogen is dissociated and emitted from the occluding member 610 within the third and fifth occlusion tanks 603 and 605. Meanwhile, the dissociation equilibrium pressure of the occluding member 610 within the second and fourth occlusion tanks 602 and 604 neighboring with the third and fifth occlusion tanks 603 and 605 drops and the occluding member 610 within the second and fourth occlusion tanks 602 and 604 occludes hydrogen.

Since the difference of internal Pressure occurs among the neighboring occlusion tanks 602 through 605 due to that, hydrogen is supplied to the second occlusion tank 602 from the third occlusion tank 603 via the hydrogen pipe 652 and hydrogen is supplied to the fourth occlusion tank 604 from the fifth occlusion tank 605 via the hydrogen pipe 652.

Here, since the check valve 654 is provided in the hydrogen pipe 652, hydrogen will not flow from the third occlusion tank 603 to the fourth occlusion tank 604 through the hydrogen pipe 652.

Further, when a quantity of hydrogen dissociated in the third occlusion tank 603 is greater than a quantity of hydrogen to be occluded in the second occlusion tank 602, the pressure of the extra hydrogen is reduced to the internal pressure of the fourth occlusion tank 604 by the regulator 653 to be supplied to the fourth occlusion tank 604 because the regulator 653 is provided in the hydrogen pipe 651.

In the second stationary time, the dissociation equilibrium pressure of the occluding member 610 within the second and fourth occlusion tanks 602 and 604 rises and hydrogen is dissociated and emitted from the occluding member 610 within the second and fourth occlusion tanks 602 and 604 as shown in FIG. 23. Meanwhile, the dissociation equilibrium pressure of the occluding member 610 within the third and fifth occlusion tanks 603 and 605 neighboring with the second and fourth occlusion tanks 602 and 604 and the first occlusion tank 601 drops, and the occluding member 610 within the first, third and fifth occlusion tanks 601, 603 and 605 occlude hydrogen.

Since the difference of internal pressure occurs among the neighboring occlusion tanks due to that, hydrogen is supplied to the first occlusion tank 601 from the second occlusion tank 602 through the hydrogen pipe 652, and hydrogen is supplied to the third occlusion tank 603 from the fourth occlusion tank 604 through the hydrogen pipe 652.

Accordingly, hydrogen occluded in the occluding member 610 of the fifth occlusion tank 605 is guided to the first occlusion tank 601 sequentially via the second through fourth occlusion tanks 602–604 by repeating the first and second stationary times periodically. In the same manner, hydrogen occluded in the occluding member 610 of the fourth occlusion tank 604 is guided to the first occlusion tank 601 sequentially through the second and third occlusion tanks 602, 603 and hydrogen occluded in the occluding member 610 of the third occlusion tank 603 is guided to the first occlusion tank 601 through the second occlusion tank 602.

Further, since the temperature dissociation equilibrium pressure of the occluding member 610 stored in the first occlusion tank 601 is the highest among the occluding member 610 stored in the first through fourth occlusion tanks 601–604, the pressure of the hydrogen guided to the first occlusion tank 601 becomes high as it flows toward the first occlusion tank 601 as it is apparent from FIG. 23. Then, according to the present embodiment, the first occlusion tank 601 is called as a starting tank, the second occlusion tank 602 is called as a high-pressure tank, the third occlusion tank 603 is called as a medium-pressure tank, the fourth occlusion tank 604 is called as a low-pressure tank, and the fifth occlusion tank 605 is called as a stationary time tank, respectively.

Here, since the quantity of hydrogen guided from the second through fifth occlusion tanks 602–605 to the first occlusion tank 601 is greater than the quantity of hydrogen occluded by the occluding member 610 within the first occlusion tank 601, a part of hydrogen guided from the second through fifth occlusion tanks 602–605 to the first occlusion tank 601 is occluded by the occluding member 610 within the first occlusion tank 601 and the other part of hydrogen is supplied to the outside (heater 700).

Next, the characteristic points of the present embodiment will be described.

In the Stationary Time Mode, an enough quantity of hydrogen may be occluded in the occluding member 610 within the first occlusion tank 601 and hydrogen may be supplied stably because hydrogen is guided to the starting tank (first occlusion tank) 601 while sequentially boosting from the stationary time tank (fifth occlusion tank) 605 to the high-pressure tank (second occlusion tank) 602, and a part of the guided hydrogen is occluded in the occluding member 610 within the first occlusion tank 601.

Further, since high pressure hydrogen is supplied to the starting tank 601, the high pressure hydrogen may be supplied reliably even when the pressure within the starting tank 601 is low because the outside air temperature is low in starting the system. Moreover, a quantity of hydrogen required by the heater 700 may be supplied instantly with good response.

Further, since the high pressure hydrogen may be supplied without using pumping means such as a compressor, a number of parts and the structure of the hydrogen supply system 600 may be simplified and its production cost may be reduced.

Here, the volume of the starting tank 601 is reduced as compared to that of the high-pressure tank 602, the medium-pressure tank 603, the low-pressure tank 604 and the stationary time tank 605 so that the internal pressure can be readily boosted while suppressing the internal pressure (hydrogen gas pressure) of the first occlusion tank 601 from dropping also in the present embodiment similarly to the ninth embodiment.

Eleventh Embodiment

Figure 24:
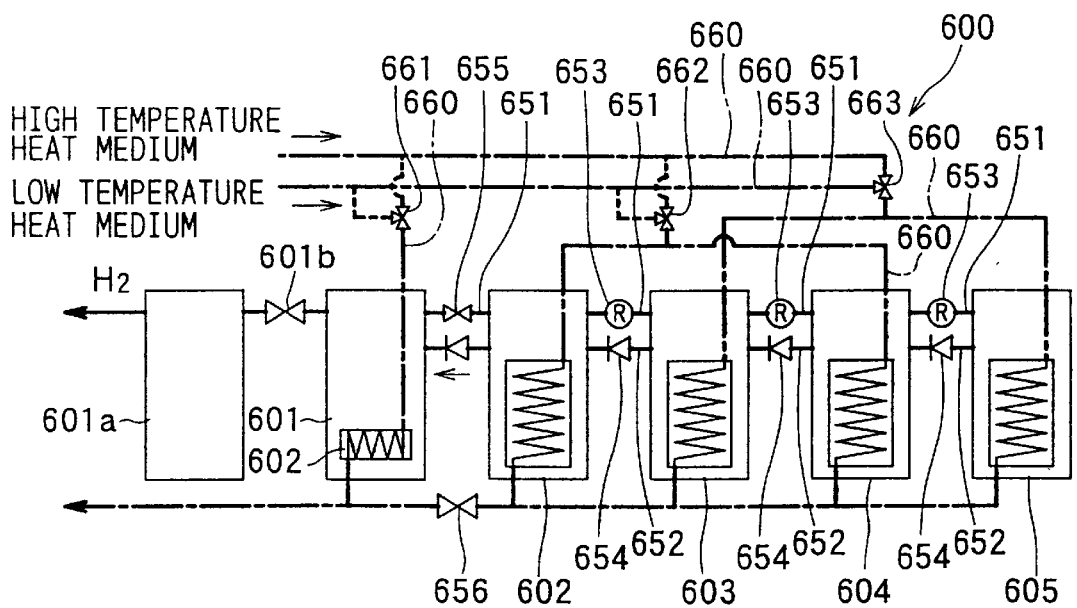
FIG. 24 is a schematic view showing a hydrogen supply system (eleventh embodiment).

According to the present embodiment, an additional (high-pressure) tank 601a for simply storing hydrogen is provided on the side of an object to which hydrogen is supplied (on the side of the heater 700 in the present embodiment) from the starting tank 601 without using the occluding member 610 and a switch valve 601b is provided in a hydrogen pipe connecting the preliminary tank 601a with the starting tank 601 to close the switch valve 601b in stopping to supply hydrogen as shown in FIG. 24.

Thereby, even when the temperature of the occluding member 610 within the respective tanks 601–605 drops and hydrogen is occluded in the occluding member 610 in stopping to supply hydrogen, hydrogen stored within the additional tank 601a may be supplied. Thus, hydrogen may be supplied reliably even in starting in low temperature.

Here, FIG. 24 shows the case in which the present invention is applied to the hydrogen supply system of the eleventh embodiment. However, the present invention is not limited only to that, and may be applied also to the hydrogen supply system of the ninth embodiment.

Modifications

According to the above-described ninth through eleventh embodiments, the present invention has been applied to the hydrogen supply system for supplying hydrogen to the heater 700. However, the present invention is not limited only to that, and may be applied to other hydrogen supply systems such as a hydrogen supply system of fuel battery that causes electric power by chemically reacting hydrogen with oxygen.

According to the above-described ninth embodiment, the occluding member 610 of which temperature dissociation equilibrium pressure is equal is stored in each of the occlusion tanks 601–605. Alternatively, the occluding member 610 of which temperature dissociation equilibrium pressure is different may be stored in each of the occlusion tanks 601–605.

According to the above-described tenth embodiment, the occluding member 610 having different temperature dissociation equilibrium pressure has been used. Alternatively, the pressure of dissociated hydrogen may be boosted sequentially to guide to the first occlusion tank 601 by storing the occluding member 610 of which temperature dissociation equilibrium pressure is equal to each of the occlusion tanks 601–605 and by differentiating the temperature of hot and cold heating medium to be supplied to the respective occlusion tanks 601–605 per occlusion tank.

What is claimed is:

1. A hydrogen occluding core, comprising:
   a tube through which heating medium flows; and
   a hydrogen occluding member filled around said tube, said hydrogen occluding member occluding and dissociating hydrogen, and exchanging heat between said hydrogen occluding member and said heating medium, wherein said tube includes an elastically tube deforming section, and thickness of said tube deforming section is thinner than thickness of remaining parts of said tube.

2. A hydrogen occluding core according to claim 1, wherein said tube deforming section includes a tube curved portion formed in a circular arc in cross section.

3. A hydrogen occluding core according to claim 1, further comprising:

a fin provided on an outer surface of said tube, for promoting heat exchange, wherein said fin is bonded with said tube at two different places on the outer surface, and said fin includes a fin deforming portion which elastically deforms in correspondence with changes of a dimension between the two different places.

4. A hydrogen occluding core according to claim 3, wherein said fin deforming portion includes a fin curved section in which a part of fin is curved.

* * * * *

UNITED STATES PATENT AND TRADEMARK OFFICE
CERTIFICATE OF CORRECTION

PATENT NO. : 6,604,573 B2
DATED : August 12, 2003
INVENTOR(S) : Shingo Morishima et al.

It is certified that error appears in the above-identified patent and that said Letters Patent is hereby corrected as shown below:

<u>Title page,</u>
Item [75], Inventors, delete "Toshihiro Mafune"

Signed and Sealed this

Ninth Day of March, 2004

JON W. DUDAS
*Acting Director of the United States Patent and Trademark Office*